United States Patent
Boenapalli et al.

(10) Patent No.: US 11,782,837 B2
(45) Date of Patent: Oct. 10, 2023

(54) SYSTEMS AND METHODS FOR FAST MEMORY ACCESS

(71) Applicant: QUALCOMM Incorporated, San Diego, CA (US)

(72) Inventors: Madhu Yashwanth Boenapalli, Hyderabad (IN); Sai Praneeth Sreeram, Anantapur (IN); Surendra Paravada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 17/453,572

(22) Filed: Nov. 4, 2021

(65) Prior Publication Data

US 2023/0134404 A1 May 4, 2023

(51) Int. Cl.
*G06F 12/084* (2016.01)
*G06F 12/02* (2006.01)
*G06F 15/78* (2006.01)
*G06F 13/16* (2006.01)

(52) U.S. Cl.
CPC .......... *G06F 12/084* (2013.01); *G06F 12/0238* (2013.01); *G06F 12/0292* (2013.01); *G06F 13/1668* (2013.01); *G06F 15/7807* (2013.01); *G06F 2212/7201* (2013.01)

(58) Field of Classification Search
None
See application file for complete search history.

(56) References Cited

U.S. PATENT DOCUMENTS

| 2020/0301852 A1* | 9/2020 | Byun ................. G06F 12/0246 |
| 2020/0320008 A1 | 10/2020 | Byun et al. |
| 2021/0240608 A1 | 8/2021 | Jean et al. |

FOREIGN PATENT DOCUMENTS

WO 2014081100 A1 5/2014

OTHER PUBLICATIONS

International Search Report and Written Opinion for International Patent Application No. PCT/US2022/077661, mailed Jan. 31, 2023, 23 pages.
Jedec Standard, "Universal Flash Storage (UFS) Host Performance Booster (HPB) Extension", Version 2. 0, Jedec - Jedec Solid State Technology Association, Vol. JESD220-3A, Sep. 1, 2020, 42 Pages, XP009541919, Section 5.

* cited by examiner

*Primary Examiner* — Charles J Choi
(74) *Attorney, Agent, or Firm* — W&T/Qualcomm

(57) ABSTRACT

Systems and methods for fast memory access are disclosed. In one aspect, a processor such as, for example, a control circuit in a system on a chip (SoC) that couples to an external memory such as, for example a Universal File System (UFS) memory (e.g., a NAND flash memory) with a partial logical to physical (L2P) mapping table stored in the external memory as well as a local L2P mapping table stored in a local memory (e.g., dynamic random-access memory (DRAM)). The control circuit may evaluate what percentage of entries in the local L2P mapping table are active compared to inactive. If the number of inactive exceeds the number of active, the control circuit may send a read command without accessing the local L2P mapping table.

29 Claims, 6 Drawing Sheets

US 11,782,837 B2

SYSTEMS AND METHODS FOR FAST MEMORY ACCESS

BACKGROUND

I Field of the Disclosure

The technology of the disclosure relates generally to accessing data stored in NAND flash memory.

II Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. Almost every computing device relies on various levels of memory to store data and operating instructions. For example, there may be a system memory that accesses NAND flash memory. Because access to NAND flash memory is relatively slow, there may be a cache memory associated with the processor that facilitates address mapping to expedite memory access. Even though there are various ways to improve memory access, there is seemingly always room for improved memory access.

SUMMARY

Aspects disclosed in the detailed description include systems and method for fast memory access. In particular, exemplary aspects of the present disclosure contemplate a processor such as, for example, a control circuit in a system on a chip (SoC) that couples to an external memory such as, for example, a universal flash storage (UFS) memory (e.g., a NAND flash memory) with a partial logical-to-physical (L2P) mapping table stored in the external memory as well as a local L2P mapping table stored in a local memory (e.g., dynamic random-access memory (DRAM)). The control circuit may evaluate what percentage of entries in the local L2P mapping table are active compared to inactive. If the number of inactive exceeds the number of active, the control circuit may send a read command without accessing the local L2P mapping table. Skipping the local memory in this fashion relies on the more up-to-date entries in the external memory, which likely results in a faster memory call to the UFS memory, resulting in a better user experience.

In this regard in one aspect, a SoC is disclosed. The SoC includes a memory bus interface configured to couple to a UFS memory having an external cache memory. The external cache memory includes a partial L2P mapping table of the UFS memory. The SoC also includes a local cache memory including a local L2P mapping table of the UFS memory. The SoC also includes a control circuit coupled to the memory bus interface and the local cache memory. The control circuit is configured to determine an active size of an active portion of the local L2P mapping table in the local cache memory. The control circuit is also configured to compare the active size of the active portion to a threshold.

In another aspect, a SoC is disclosed. The SoC includes a memory bus interface configured to couple to a UFS memory having an external cache memory. The external cache memory includes a partial L2P mapping table of the UFS memory. The SoC also includes a local cache memory comprising a local L2P mapping table of the UFS memory. The SoC also includes a control circuit coupled to the memory bus interface and the local cache memory. The control circuit is configured to determine an inactive size of an inactive portion of the local L2P mapping table in the local cache memory. The control circuit is also configured to compare the inactive size of the inactive portion to a threshold.

In another aspect, a method of accessing memory from a host is disclosed. The method includes determining an active size of an active portion of a local L2P mapping table in a local cache memory associated with a host relative to a partial L2P mapping table in an external cache memory in a remote memory device. The method also includes comparing the active size of the active portion to a threshold.

DETAILED DESCRIPTION

Figure 1:
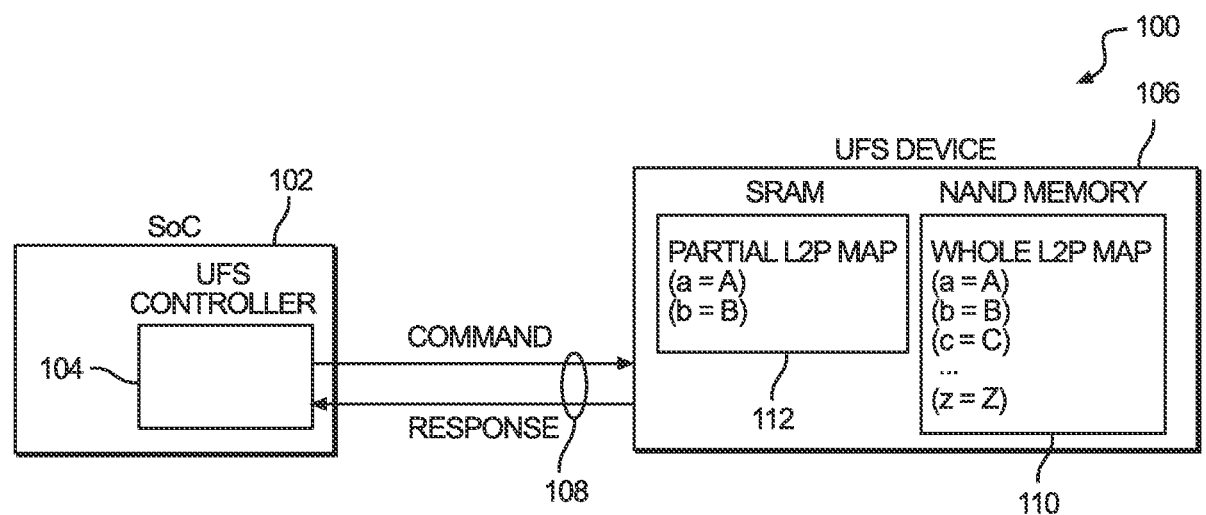
FIG. 1 is a block diagram of a conventional computing system with a host and universal flash storage (UFS) memory associated therewith.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and method for fast memory access. In particular, exemplary aspects of the present disclosure contemplate a processor such as, for example, a control circuit in a system on a chip (SoC) that couples to an external memory such as, for example, a universal flash storage (UFS) memory (e.g., a NAND flash memory) with a partial logical-to-physical (L2P) mapping table stored in the external memory as well as a local L2P mapping table stored in a local memory (e.g., dynamic random-access memory (DRAM)). The control circuit may evaluate what percentage of entries in the local L2P mapping table are active compared to inactive. If the number of inactive exceeds the number of active, the control circuit may send a read command without accessing the local L2P mapping table. Skipping the local memory in this fashion relies on the more up-to-date entries in the external memory, which likely results in a faster memory call to the UFS memory, resulting in a better user experience.

Figure 2:
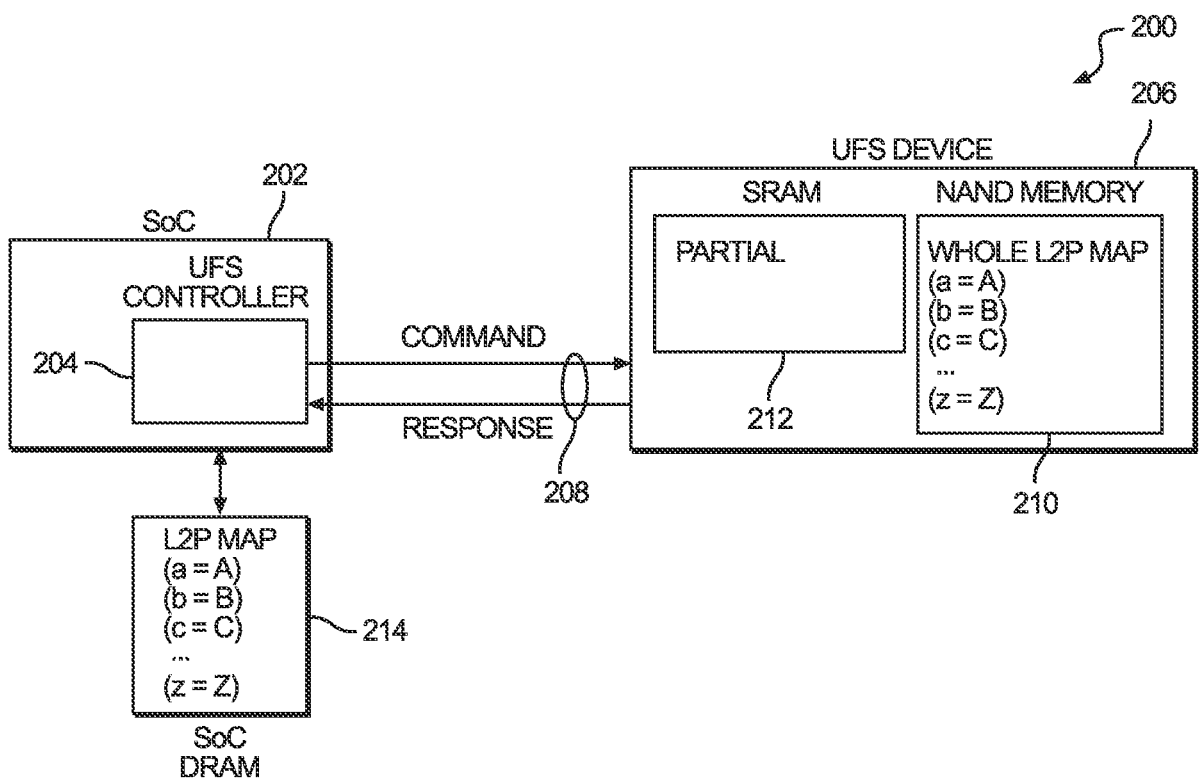
FIG. 2 is a block diagram of an exemplary computing system with a UFS memory associated therewith that uses a Host Performance Booster (HPB) to improve memory access times and may use exemplary aspects of the present disclosure to further improve memory access times.
Figure 3:
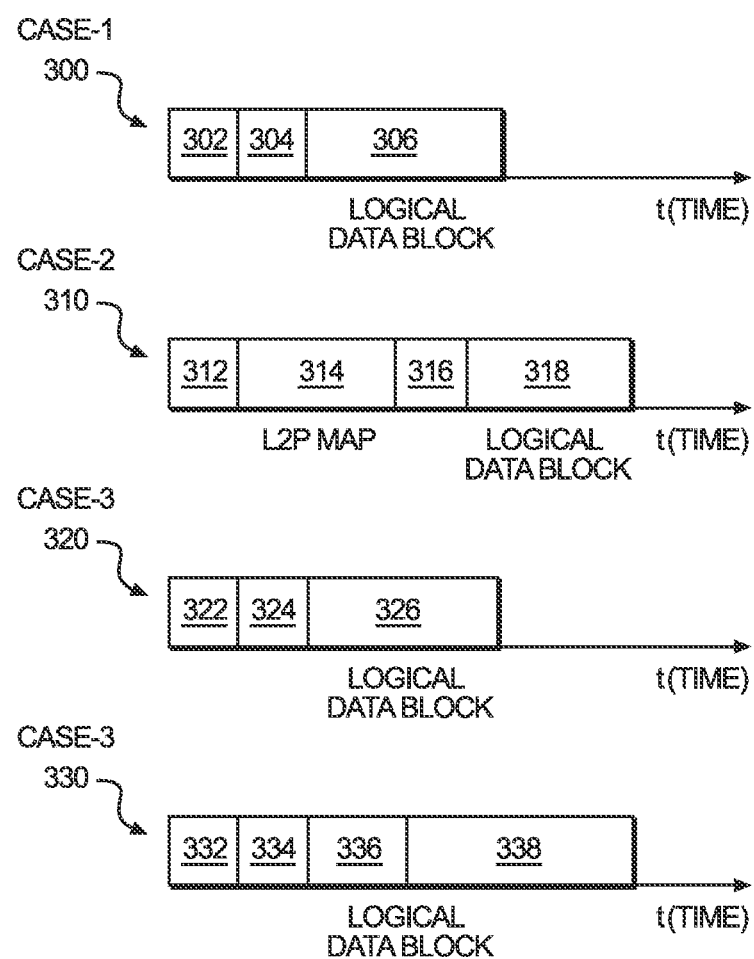
FIG. 3 is a signal-versus-time diagram of conventional memory access times with cache hits and cache misses.

A brief overview of a computing device having a host and UFS memory is provided in FIG. 1. FIG. 2 shows a similar computing device that has a Host Performance Booster (HPB) enabled thereon and may implement exemplary aspects of the present disclosure. FIG. 3 illustrates situations where memory calls resulting in cache misses may negatively impact performance to highlight how exemplary aspects of the present disclosure may improve performance as better illustrated beginning at FIG. 4.

In this regard, FIG. 1 illustrates a computing device 100 with a system on a chip (SoC) 102, that has a UFS controller 104 therein. The SoC 102 may be a single integrated circuit (IC) having multiple functions therein, perhaps on different layers such as is possible using three-dimensional (3D) IC manufacturing techniques, may be a set of stacked dies (e.g., a flip chip arrangement), or the like. The SoC 102 may be coupled to a UFS memory 106 by a UFS bus 108. The UFS memory 106 may include a NAND memory element 110 and an SRAM memory element 112. The NAND memory element 110 may store a whole L2P mapping table therein, and this whole L2P mapping table is always up to date. The SRAM memory element 112 may include an external cache that includes a partial L2P mapping table that has entries corresponding to the most recently (and/or most frequently) accessed logical addresses. The NAND memory element 110 may have relatively slow read times compared to the SRAM memory element 112.

It should be appreciated that in use, the UFS controller 104 may generate a read command, which initially queries the SRAM memory element 112 to find a physical address. If the partial L2P mapping table includes an L2P mapping for the requested address, the UFS memory 106 retrieves the L2P map entry from the SRAM memory element 112. The UFS memory 106 then reads the logical block from the NAND memory element 110 and transfers the data to the SoC 102 (see generally signaling case 300 in FIG. 3). If, however, the partial L2P mapping table does not include the logical address, then the UFS memory 106 receives the read command and reads the physical address from the whole L2P mapping table in the NAND memory element 110. The UFS memory 106 stores an entry in the partial L2P mapping table in the SRAM memory element 112. Then the L2P map entry is retrieved from the SRAM memory element 112. The UFS memory 106 then reads the logical block from the NAND memory element 110 and transfers the data to the SoC 102 (see generally signaling case 310 in FIG. 3).

While using a cache such as is provided in the SRAM memory element 112 may expedite accessing logical blocks in the NAND memory element 110 when there is an entry in the partial L2P mapping table, there will be times when there is a cache miss resulting in signaling case 310. The additional time to retrieve the address from the whole L2P mapping table in the NAND memory element 110 negatively impacts the user experience and may add unacceptable latency to certain operations within the computing device 100.

To improve performance, the industry has moved towards adopting the concept of a HPB, which moves an entire L2P mapping table into the SoC as better illustrated in FIG. 2 with cases 320 and 330 of FIG. 3. In this regard, FIG. 2 illustrates a computing device 200 with a SoC 202, that has a UFS controller 204 therein. The SoC 202 may be coupled to a UFS memory 206 by a UFS bus 208. The UFS memory 206 may include a NAND memory element 210 and an SRAM memory element 212. The NAND memory element 210 may store a whole L2P mapping table therein and this whole L2P mapping table is always up to date. The SRAM memory element 212 may include a cache that includes a partial L2P mapping table that has entries corresponding to the most recently (and/or most frequently) accessed logical addresses. Additionally, the SoC 202 may also include a DRAM element 214 which stores a local L2P mapping table therein. The DRAM element 214 acts as a cache and allows the SoC 202 to have immediate access to the physical address. The SoC 202 can then send the physical address to the UFS memory 206 with the read command (see generally signaling case 320 in FIG. 3).

However, there are times when entries in the local L2P mapping table in the DRAM element 214 are out of date or incorrect. For example, sometimes data needs to be moved to another physical area of the NAND memory element 210 for internal maintenance purposes (e.g., refresh operations, garbage collection, read-reclaims, read-disturbs, and the like). In such cases, the local L2P mapping table in the DRAM element 214 may be out of sync with the whole L2P mapping table in the NAND memory element 210. Traditionally, a HPB allows the UFS memory 206 to send an update to the SoC 202. However, this update is periodic and not instantaneous. Accordingly, read operations directed to an address that is out of sync may result in a cache miss as well (see generally signaling case 330 in FIG. 3). Such cache misses may negatively impact the user experience and/or potentially introduce unacceptable latency for the computing device 200.

FIG. 3 provides a comparison of the signaling cases 300, 310, 320, and 330. Signaling case 300 begins with a read command 302 being issued and sent to the UFS memory 106, which retrieves the L2P map entry from the partial L2P mapping table in the SRAM memory element 112 at 304. Using the logical address from the partial L2P mapping table, the UFS memory 106 reads the logical block from the NAND memory element 110 and transfers the data to the SoC 102 at 306. While not precisely to scale, the size of 306 indicates the relative slowness of accessing the NAND memory element 110 compared to accessing the SRAM memory element 112 at 304.

Signaling case 310 illustrates a cache miss for the computing device 100 and begins with a read command 312 being issued and sent to the UFS memory 106. The UFS memory 106 looks to the SRAM memory element 112, finds no mapping entry, and accordingly reads from the whole L2P mapping table in the NAND memory element 110 and stores the entry in the SRAM memory element 112 at 314, introducing delay. The address is then retrieved from the SRAM memory element 112 at 316. Using the logical address from the partial L2P mapping table, the UFS memory 106 reads the logical block from the NAND memory element 110 and transfers the data to the SoC 102 at 318. The additional delay introduced by the cache miss may prove unacceptable.

Signaling case 320 begins with the UFS controller 204 accessing the DRAM element 214 to retrieve a logical address from the local L2P mapping table at 322. Then a read command with the logical address is sent to the UFS memory 206 at 324. Using the logical address, the UFS memory 206 reads the logical block from the NAND memory element 210 and transfers the data to the SoC 202 at 326. Using a HPB in this manner reduces the delays caused by the cache misses of signaling case 310. However, there are still cache misses as illustrated in signaling case 330.

Signaling case 330 begins with the UFS controller 204 accessing the DRAM element 214 to retrieve a logical address from the local L2P mapping table at 332. Then a read command with the logical address is sent to the UFS memory 206 at 334. However, the logical address provided in the read command is incorrect, and the UFS device must read an L2P entry from the whole L2P mapping table in the NAND memory element 210 at 336. Using the address from the whole L2P mapping table, the UFS memory 206 reads the logical block from the NAND memory element 210 and transfers the data to the SoC 202 at 338. Again, this cache miss may introduce unacceptable delay.

Exemplary aspects of the present disclosure reduce the probability that a cache miss such as shown in signaling case 330 occurs by estimating how much of the local L2P mapping table in the local cache (e.g., DRAM) is active relative to how much is inactive. Based on this estimation, the SoC only uses the HPB methodology when the inactive portion is smaller than the active portion. In essence, when the active portion is larger than the inactive portion, the SoC determines that it is more likely than not that the address is within the active portion and thus accurate and up to date. Conversely, when the inactive portion is larger than the active portion, the SoC determines that it is more likely than not that the address is within the inactive portion and likely not accurate nor up to date and as such, should not be used. In such a case, it is more efficient to use the partial L2P mapping table in the external cache (e.g., the SRAM) and possible cache miss thereof than use the likely cache miss of the HPB methodology.

Active is a term defined in the HPB industry, and, as used herein, means that an entry in the local L2P mapping table is identical to an entry in the partial L2P mapping table. Likewise, inactive as used herein means that an entry in the local L2P mapping table does not have an entry or has a different entry in the partial L2P mapping table. In an exemplary aspect, the UFS memory may take initiative (assuming device control mode is initiated) in transferring active and inactive addresses or regions to the SoC, such as after or during maintenance activities (e.g., refresh operations) at the UFS memory. Based on these updates, the SoC may make updates to the local L2P mapping table in the local cache (e.g., the DRAM).

Figure 4:
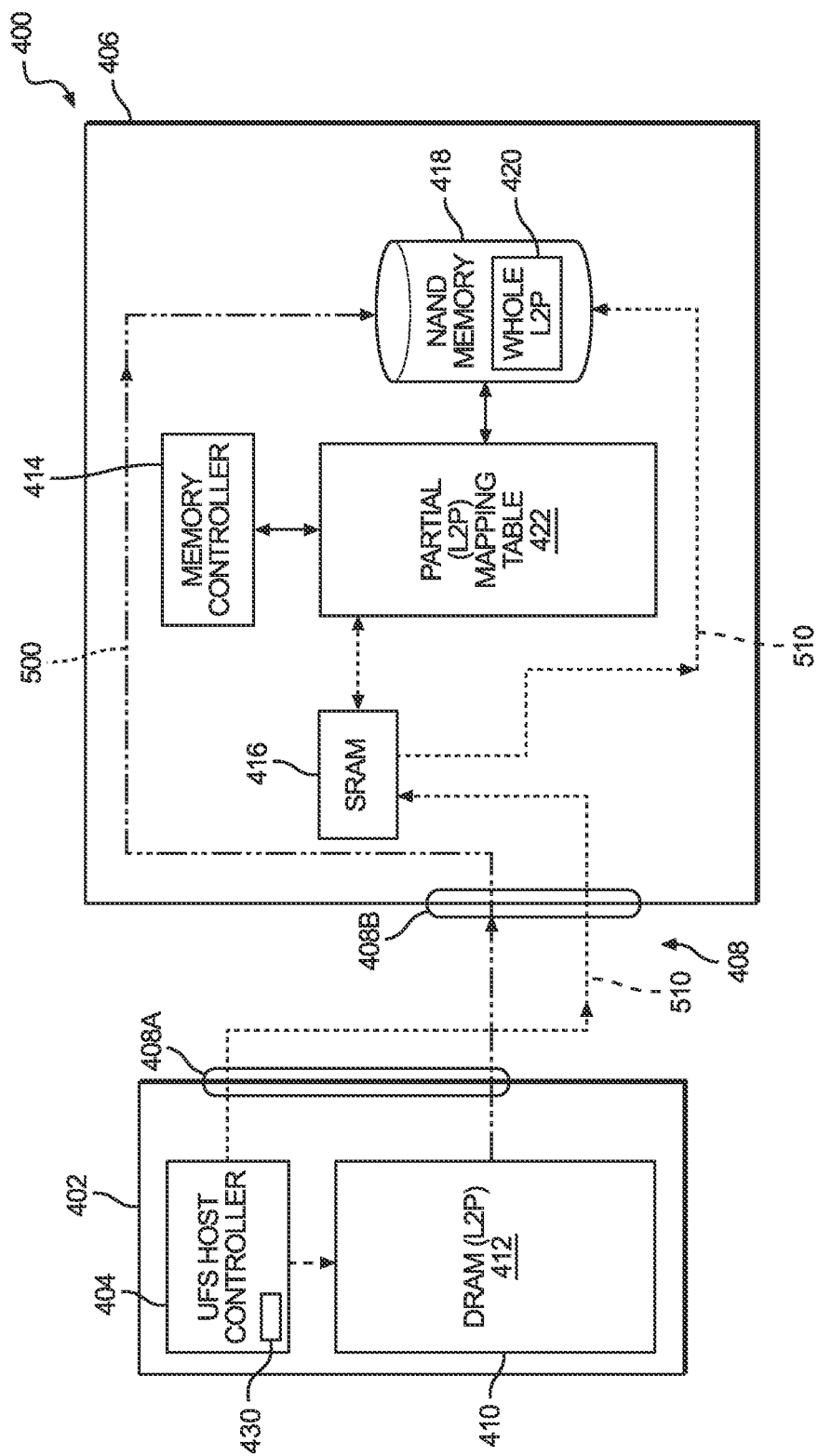
FIG. 4 is a block diagram of a computing device with a host and UFS memory associated therewith showing memory accesses under exemplary aspects of the present disclosure.

In this regard, FIG. 4 illustrates a computing device 400 that includes a SoC 402 having a UFS host controller or control circuit 404 therein. The SoC 402 is coupled to a UFS memory 406 by a memory bus 408, which may be a UFS bus. The SoC 402 may include a memory bus interface 408A, which may be a UFS bus interface. Likewise, the UFS memory 406 may include a memory bus interface 408B. The SoC 402 may further include a local cache memory, for example, DRAM 410, which stores a local L2P mapping table 412 for the UFS memory 406. In an exemplary aspect, the local L2P mapping table 412 is an entire L2P mapping table having a physical address for every logical address. In another exemplary aspect, the local L2P mapping table 412 is a partial L2P mapping table. The presence of the DRAM 410 with the local L2P mapping table 412 contemplates that HPB methodologies are possible for read commands to the UFS memory 406.

The UFS memory 406 may include a memory controller 414, an external cache memory, e.g., SRAM 416, and a NAND memory element 418. The NAND memory element 418 may store a whole L2P mapping table 420 therein and this whole L2P mapping table 420 is always up to date. The SRAM 416 may be or include an external cache that includes a partial L2P mapping table 422 of the UFS memory 406 that has entries corresponding to the most recently (and/or most frequently) accessed logical addresses.

As noted above, exemplary aspects of the present disclosure contemplate determining an active size of an active portion of the local L2P mapping table 412 in the DRAM 410 and comparing the active size of the active portion to a threshold. The threshold may be an inactive size of an inactive portion of the local L2P mapping table 412. There are various ways that the active size may be determined. In an exemplary aspect, a circuit 430 may include one or more counters, registers, and a comparator. When there is an update from the UFS memory 406, the counter counts each active entry and optionally each inactive entry. The comparator may then compare the value of the counter(s) to a total size of the local L2P mapping table 412 stored in a register to determine a percentage or the like. Equivalently, the present disclosure contemplates determining the inactive size of the inactive portion of the local L2P mapping table 412 and comparing the inactive size of the inactive portion to a threshold. Likewise, there are various ways that the inactive size may be determined.

Figure 5:
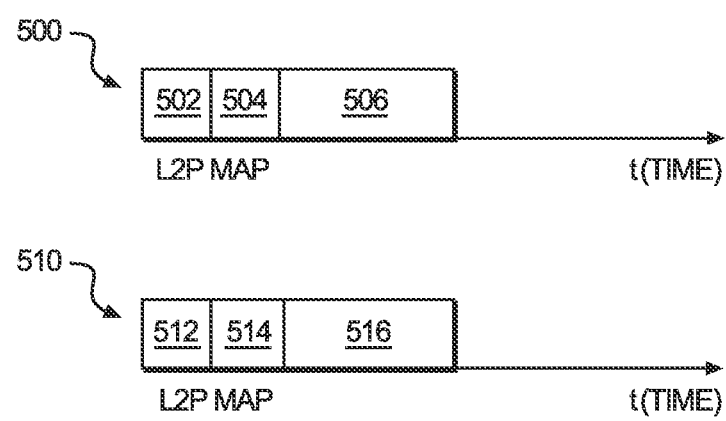
FIG. 5 is a signal-versus-time diagram of memory access times according to exemplary aspects of the present disclosure.

Based on the comparison, two possible signaling cases 500 and 510 may arise as illustrated in FIG. 5. Specifically, the signaling case 500 occurs when the control circuit 404, using circuit 430 for example, determines that the active portion is larger than the inactive portion. From this determination, the control circuit 404 infers that it is more likely than not that the information in the local L2P mapping table 412 is correct and blindly goes to the local L2P mapping table 412 for all read transactions. Thus, the signaling case 500 is, after the determination that the active portion exceeds the threshold, similar to the signaling case 320 beginning with retrieving a logical address from the local L2P mapping table 412 in the DRAM 410 at 502 and then sending a read command containing the logical address to the UFS memory 406 at 504. This general process is shown by dotted line 500 in FIG. 4. The UFS memory 406 then reads the logical block from the NAND memory element 418. The read data is then transferred to the SoC 402 at 506.

However, when the control circuit 404 determines that the active size of the active portion does not exceed the threshold (e.g., the inactive size of the inactive portion), then, despite the presence of HPB methodologies, exemplary aspects of the present disclosure may skip or omit use of the local L2P mapping table 412 in the DRAM 410 and use signaling case 510. Signaling case 510 is based on the inference that more likely than not, a random read transaction has an address that is inaccurate in the local L2P mapping table 412. Accordingly, in signaling case 510, the control circuit 404 sends a read command to the UFS memory 406 through the memory bus 408 and particularly to the SRAM 416 at 512. The SRAM 416 checks the partial L2P mapping table 422 for the logical address at 514. Then, the UFS memory 406 reads the logical block from the NAND memory element 418 and the read data is transferred to the SoC 402 at 516. Signaling case 510 avoids the cache miss of signaling case 330 and improved performance.

Figure 6:
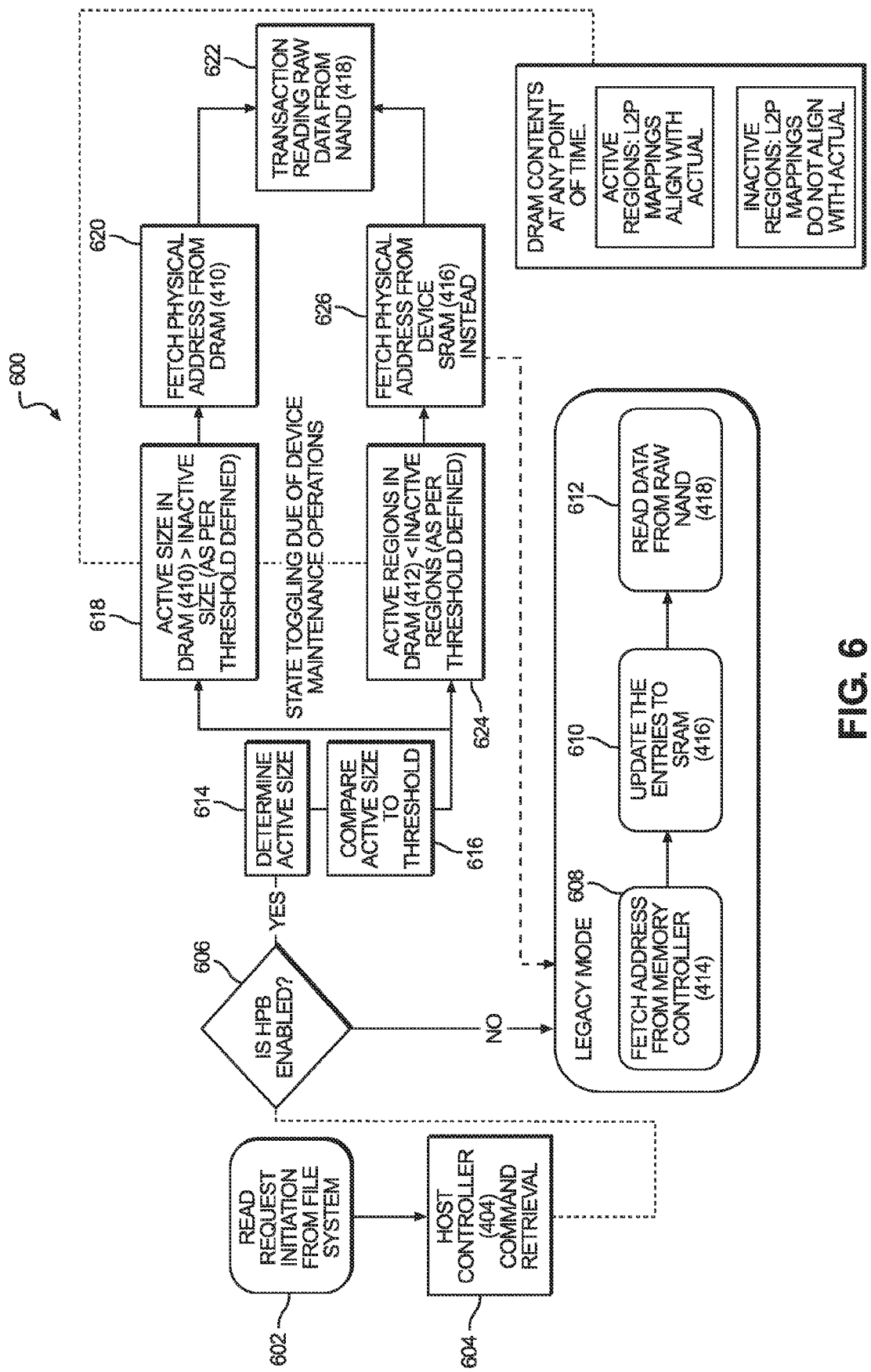
FIG. 6 is a flowchart of a process associated with exemplary aspects of the present disclosure that work with legacy and enabled devices.

A more complete explanation of a process 600 associated with the present disclosure is provided with reference to FIG. 6. The process 600 begins with a read request initiation from a file system in the SoC 402 (block 602). The host controller or control circuit 404 begins command retrieval (block 604). The control circuit 404 may determine if HPB is enabled (block 606).

If the answer to block 606 is no, HPB is not enabled, the process 600 enters a legacy mode and fetches an address from the memory controller 414 (block 608), which updates entries to the SRAM 416 (block 610) and reads data from the raw NAND memory element 418 (block 612). Note that this path corresponds to possible signaling cases 300 and 310.

If, however, the answer to block 606 is yes, HPB is enabled, the process 600 determines an active size of an active portion in the local L2P mapping table 412 in the DRAM 410 (block 614). Equivalently, but not shown, the process 600, and particularly the control circuit 404, may determine an inactive size of an inactive portion. This determination of the active size may be done directly (e.g., how many addresses are active) or indirectly (e.g., find how many addresses are inactive and then subtract the number of inactive addresses from a total number of addresses to determine how many addresses are active). The control circuit 404 may then compare the active size to a threshold (block 616). As noted, an exemplary threshold is the number of inactive addresses or inactive sub-regions. Note that this threshold may also be a scaled value of inactive addresses. For example, is the active size greater than fifty-five percent of the inactive size. As another example, if the number of active addresses exceeds the number of inactive addresses, the number of inactive addresses is effectively the threshold.

Based on the comparison, the process 600 bifurcates. In a first path, the control circuit 404 has determined that the active size in the DRAM 410 exceeds the inactive size (block 618). Accordingly, the control circuit 404 fetches the physical address from the DRAM 410 (block 620) and particularly from the local L2P mapping table 412. On receipt of the read command with the physical address, the UFS memory 406 performs the transaction of reading the raw data from the NAND memory element 418 (block 622).

In a second path, the control circuit 404 has determined that the active size in the DRAM 410 is less than the threshold (block 624). Accordingly, the control circuit 404 fetches the physical address from the SRAM 416 (block 626) and particularly from the partial L2P mapping table 422 instead of the DRAM 410. If there is no entry in the SRAM 416, then the process may secure the address by entering the legacy mode as noted. Once the physical address is located, the UFS memory 406 performs the transaction of reading the raw data from the NAND memory element 418 (block 622).

The systems and methods for fast memory access according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
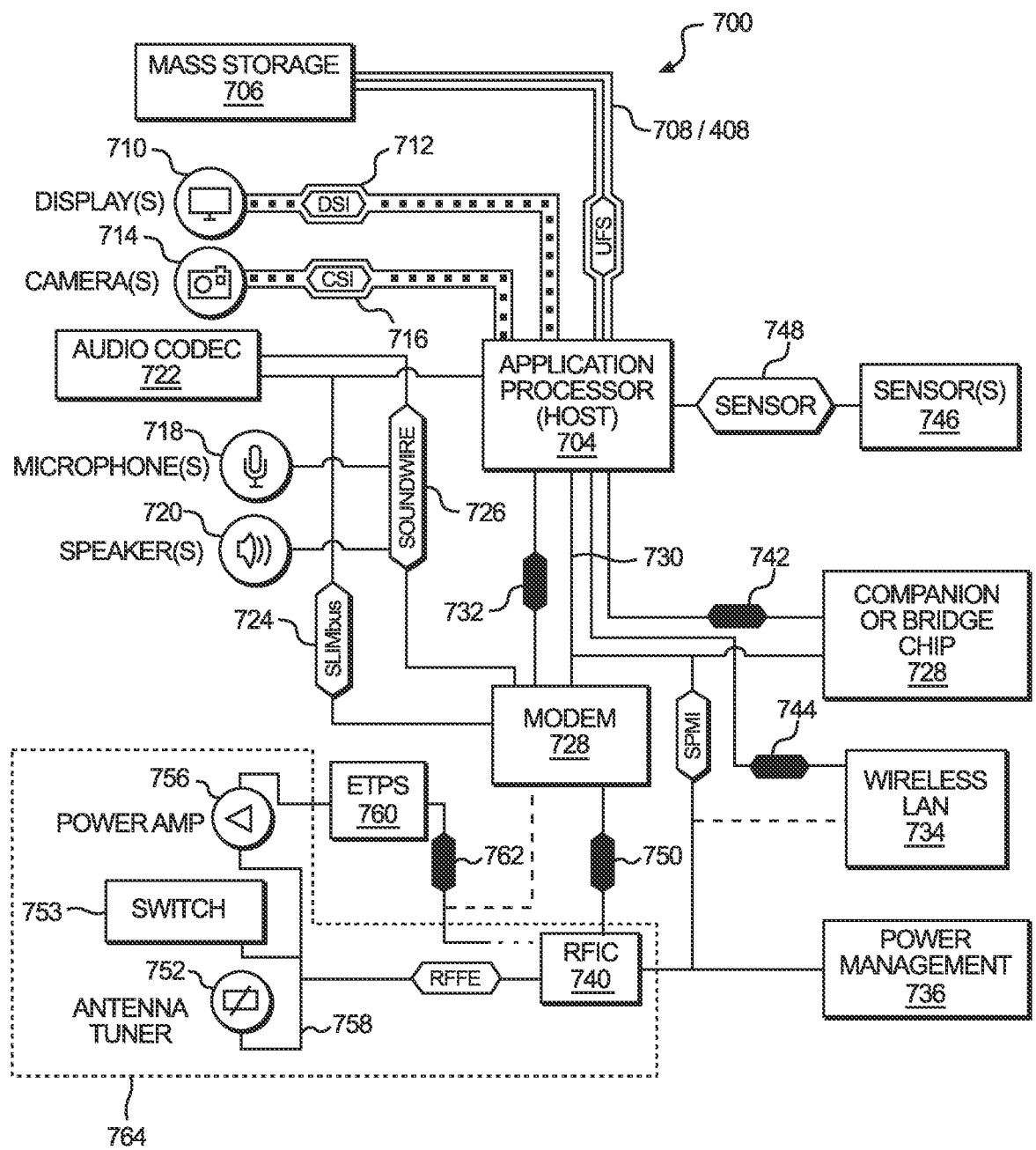
FIG. 7 is a block diagram of a computing device having a host and UFS memory that may operate according to the fast memory access aspects of the present disclosure.

In this regard, FIG. 7 illustrates an example of a processor-based system 700 that can employ the fast memory access processes illustrated in FIGS. 4-6. While a mobile terminal having UFS memory may be particularly contemplated as being capable of benefiting from exemplary aspects of the present disclosure, it should be appreciated that the present disclosure is not so limited and may be useful in any system having NAND based memory elements.

With continued reference to FIG. 7, the processor-based system 700 includes an application processor 704 (sometimes referred to as a host) that communicates with a mass storage element 706 (e.g., UFS memory 406) through a UFS bus 708 (e.g., UFS bus 408). The application processor 704 may further be connected to a display 710 through a display serial interface (DSI) bus 712 and a camera 714 through a camera serial interface (CSI) bus 716. Various audio elements such as a microphone 718, a speaker 720, and an audio codec 722 may be coupled to the application processor 704 through a serial low-power interchip multimedia bus (SLIMbus) 724. Additionally, the audio elements may communicate with each other through a SOUNDWIRE bus 726. A modem 728 may also be coupled to the SLIMbus 724 and/or the SOUNDWIRE bus 726. The modem 728 may further be connected to the application processor 704 through a peripheral component interconnect (PCI) or PCI express (PCIe) bus 730 and/or a system power management interface (SPMI) bus 732.

With continued reference to FIG. 7, the SPMI bus 732 may also be coupled to a local area network (LAN or WLAN) IC (LAN IC or WLAN IC) 734, a power management integrated circuit (PMIC) 736, a companion IC (sometimes referred to as a bridge chip) 738, and a radio frequency IC (RFIC) 740. It should be appreciated that separate PCI buses 742 and 744 may also couple the application processor 704 to the companion IC 738 and the WLAN IC 734. The application processor 704 may further be connected to sensors 746 through a sensor bus 748. The modem 728 and the RFIC 740 may communicate using a bus 750.

With continued reference to FIG. 7, the RFIC 740 may couple to one or more RFFE elements, such as an antenna tuner 752, a switch 754, and a power amplifier 756 through a radio frequency front end (RFFE) bus 758. Additionally, the RFIC 740 may couple to an envelope tracking power supply (ETPS) 760 through a bus 762, and the ETPS 760 may communicate with the power amplifier 756. Collectively, the RFFE elements, including the RFIC 740, may be considered an RFFE system 764. It should be appreciated that the RFFE bus 758 may be formed from a clock line and a data line (not illustrated).

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random-access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A system on a chip (SoC) comprising:
    a memory bus interface configured to couple to a universal flash storage (UFS) memory having an external cache memory, the external cache memory comprising a local logical-to-physical (L2P) mapping table of the UFS memory;
    a local cache memory comprising a local L2P mapping table of the UFS memory; and
    a control circuit coupled to the memory bus interface and the local cache memory and configured to:
        determine an active size of an active portion of the local L2P mapping table in the local cache memory; and
        compare the active size of the active portion to a threshold.
2. The SoC of clause 1, wherein the control circuit configured to determine the active size is configured to determine the active size by determining an inactive size of an inactive portion of the local L2P mapping table in the local cache memory.
3. The SoC of clause 1 or 2, wherein the threshold comprises an inactive size of an inactive portion of the local L2P mapping table in the local cache memory.
4. The SoC of clauses 1 to 3, wherein the control circuit is further configured to, when the active size does not meet the threshold:
    perform a read call by sending a read command to the external cache memory without reference to the local L2P mapping table in the local cache memory.
5. The SoC of clause 4, wherein the control circuit is further configured to, for the read command, retrieve an L2P map entry from the partial L2P mapping table in the external cache memory.
6. The SoC of clause 4 or 5, wherein the control circuit is further configured to, for the read command, issue a direct call to a NAND memory element in the UFS memory when the partial L2P mapping table does not have an entry for a logical address in the read command.
7. The SoC of any preceding clause, wherein the control circuit is further configured to access an address within the local L2P mapping table in the local cache memory when the active size exceeds the threshold.
8. The SoC of any preceding clause, wherein the control circuit is further configured to synchronize the local L2P mapping table in the local cache memory to an address table in the UFS memory.
9. The SoC of any preceding clause, wherein the control circuit is further configured to determine if host performance boost is enabled.
10. The SoC of any preceding clause, wherein the control circuit configured to determine the active size determines based on how many entries are identical between the local L2P mapping table and the partial L2P mapping table.
11. The SoC of any preceding clause, wherein the local cache memory comprises a dynamic random access memory (DRAM).
12. A system on a chip (SoC) comprising:
    a memory bus interface configured to couple to a universal flash storage (UFS) memory having an external cache memory, the external cache memory comprising a partial logical-to-physical (L2P) mapping table of the UFS memory;
    a local cache memory comprising a local L2P mapping table of the UFS memory;
    a control circuit coupled to the memory bus interface and the local cache memory and configured to:
        determine an inactive size of an inactive portion of the local L2P mapping table in the local cache memory; and
        compare the inactive size of the inactive portion to a threshold.

13. The SoC of clause 12, wherein the control circuit configured to determine the inactive size is configured to determine the inactive size by determining an active size of an active portion of the local L2P mapping table in the local cache memory.
14. The SoC of clause 12 or 13, wherein the threshold comprises an active size of an active portion of the local L2P mapping table in the local cache memory.
15. The SoC of any of clauses 12 to 14, wherein the control circuit is further configured to, when the inactive size does not meet the threshold:
    perform a read call by sending a read command to the external cache memory without reference to the local L2P mapping table in the local cache memory.
16. The SoC of clause 15, wherein the control circuit is further configured to, for the read command, retrieve an L2P map entry from the partial L2P mapping table in the external cache memory.
17. The SoC of clause 15, wherein the control circuit is further configured to, for the read command, issue a direct call to a NAND memory element in the UFS memory when the partial L2P mapping table does not have an entry for a logical address in the read command.
18. The SoC of any of clauses 12 to 17, wherein the control circuit is further configured to access an address within the local L2P mapping table in the local cache memory when the inactive size exceeds the threshold.
19. The SoC of any of clauses 12 to 18, wherein the control circuit is further configured to synchronize the local L2P mapping table in the local cache memory to an address table in the UFS memory.
20. The SoC of any of clauses 12 to 19, wherein the control circuit is further configured to determine if a host performance booster is enabled.
21. The SoC of any of clauses 12 to 20, wherein the control circuit configured to determine the inactive size determines based on how many entries within the partial L2P mapping table are not found in the local L2P mapping table.
22. A method of accessing memory from a host, comprising:
    determining an active size of an active portion of a local logical-to-physical (L2P) mapping table in a local cache memory associated with a host relative to a partial L2P mapping table in an external cache memory in a remote memory device; and
    comparing the active size of the active portion to a threshold.
23. The method of clause 22, wherein determining the active size comprises determining an inactive size of an inactive portion of the local L2P mapping table in the local cache memory.
24. The method of clause 22 or 23, wherein comparing the active size comprises comparing the active size to an inactive size of an inactive portion of the local L2P mapping table in the local cache memory.
25. The method of any of clauses 22 to 24, further comprising, when the active size does not meet the threshold:
    performing a read call by sending a read command to the external cache memory without reference to the local L2P mapping table in the local cache memory.
26. The method of clause 25, further comprising, for the read command, retrieving an L2P map entry from the partial L2P mapping table in the external cache memory.
27. The method of clause 25 or 26, further comprising, for the read command, issuing a direct call to a NAND memory element in the UFS memory when the partial L2P mapping table does not have an entry for a logical address in the read command.
28. The method of any of clauses 22 to 27, further comprising accessing an address within the local L2P mapping table in the local cache memory when the active size exceeds the threshold.
29. The method of any of clauses 22 to 28, further comprising determining if a host performance booster is enabled.

What is claimed is:
1. A system on a chip (SoC) comprising:
   a memory bus interface configured to couple to a universal flash storage (UFS) memory having an external cache memory, the external cache memory comprising a partial logical-to-physical (L2P) mapping table of the UFS memory;
   a local cache memory comprising a local L2P mapping table of the UFS memory; and
   a control circuit coupled to the memory bus interface and the local cache memory and configured to:
       determine an active size of an active portion of the local L2P mapping table in the local cache memory; and
       compare the active size of the active portion to a threshold.
2. The SoC of claim 1, wherein the control circuit configured to determine the active size is configured to determine the active size by determining an inactive size of an inactive portion of the local L2P mapping table in the local cache memory.
3. The SoC of claim 1, wherein the threshold comprises an inactive size of an inactive portion of the local L2P mapping table in the local cache memory.
4. The SoC of claim 1, wherein the control circuit is further configured to, when the active size does not meet the threshold:
    perform a read call by sending a read command to the external cache memory without reference to the local L2P mapping table in the local cache memory.
5. The SoC of claim 4, wherein the control circuit is further configured to, for the read command, retrieve an L2P map entry from the partial L2P mapping table in the external cache memory.
6. The SoC of claim 4, wherein the control circuit is further configured to, for the read command, issue a direct call to a NAND memory element in the UFS memory when the partial L2P mapping table does not have an entry for a logical address in the read command.
7. The SoC of claim 1, wherein the control circuit is further configured to access an address within the local L2P mapping table in the local cache memory when the active size exceeds the threshold.
8. The SoC of claim 1, wherein the control circuit is further configured to synchronize the local L2P mapping table in the local cache memory to an address table in the UFS memory.
9. The SoC of claim 1, wherein the control circuit is further configured to determine if host performance boost is enabled.
10. The SoC of claim 1, wherein the control circuit configured to determine the active size determines based on how many entries are identical between the local L2P mapping table and the partial L2P mapping table.
11. The SoC of claim 1, wherein the local cache memory comprises a dynamic random access memory (DRAM).
12. A system on a chip (SoC) comprising:

a memory bus interface configured to couple to a universal flash storage (UFS) memory having an external cache memory, the external cache memory comprising a partial logical-to-physical (L2P) mapping table of the UFS memory;

a local cache memory comprising a local L2P mapping table of the UFS memory;

a control circuit coupled to the memory bus interface and the local cache memory and configured to:
- determine an inactive size of an inactive portion of the local L2P mapping table in the local cache memory; and
- compare the inactive size of the inactive portion to a threshold.

13. The SoC of claim 12, wherein the control circuit configured to determine the inactive size is configured to determine the inactive size by determining an active size of an active portion of the local L2P mapping table in the local cache memory.

14. The SoC of claim 12, wherein the threshold comprises an active size of an active portion of the local L2P mapping table in the local cache memory.

15. The SoC of claim 12, wherein the control circuit is further configured to, when the inactive size does not meet the threshold:
- perform a read call by sending a read command to the external cache memory without reference to the local L2P mapping table in the local cache memory.

16. The SoC of claim 15, wherein the control circuit is further configured to, for the read command, retrieve an L2P map entry from the partial L2P mapping table in the external cache memory.

17. The SoC of claim 15, wherein the control circuit is further configured to, for the read command, issue a direct call to a NAND memory element in the UFS memory when the partial L2P mapping table does not have an entry for a logical address in the read command.

18. The SoC of claim 12, wherein the control circuit is further configured to access an address within the local L2P mapping table in the local cache memory when the inactive size exceeds the threshold.

19. The SoC of claim 12, wherein the control circuit is further configured to synchronize the local L2P mapping table in the local cache memory to an address table in the UFS memory.

20. The SoC of claim 12, wherein the control circuit is further configured to determine if a host performance booster is enabled.

21. The SoC of claim 12, wherein the control circuit configured to determine the inactive size determines based on how many entries within the partial L2P mapping table are not found in the local L2P mapping table.

22. A method of accessing memory from a host, comprising:
- determining an active size of an active portion of a local logical-to-physical (L2P) mapping table in a local cache memory associated with a host relative to a partial L2P mapping table in an external cache memory in a remote memory device; and
- comparing the active size of the active portion to a threshold.

23. The method of claim 22, wherein determining the active size comprises determining an inactive size of an inactive portion of the local L2P mapping table in the local cache memory.

24. The method of claim 21, wherein comparing the active size comprises comparing the active size to an inactive size of an inactive portion of the local L2P mapping table in the local cache memory.

25. The method of claim 22, further comprising, when the active size does not meet the threshold:
- performing a read call by sending a read command to the external cache memory without reference to the local L2P mapping table in the local cache memory.

26. The method of claim 25, further comprising, for the read command, retrieving an L2P map entry from the partial L2P mapping table in the external cache memory.

27. The method of claim 25, further comprising, for the read command, issuing a direct call to a NAND memory element in the UFS memory when the partial L2P mapping table does not have an entry for a logical address in the read command.

28. The method of claim 22, further comprising accessing an address within the local L2P mapping table in the local cache memory when the active size exceeds the threshold.

29. The method of claim 22, further comprising determining if a host performance booster is enabled.

\* \* \* \* \*